(12) United States Patent
Tatarkiewicz et al.

(10) Patent No.: US 10,996,928 B1
(45) Date of Patent: May 4, 2021

(54) METHOD AND APPARATUS FOR TRITIUM-BASED TRUE RANDOM NUMBER GENERATOR

(71) Applicant: RANDAEMON sp. z o.o., Warsaw (PL)

(72) Inventors: Jan Jakub Tatarkiewicz, San Diego, CA (US); Janusz Jerzy Borodzinski, Warsaw (PL); Wieslaw Bohdan Kuzmicz, Warsaw (PL); Krystyna Tatarkiewicz, San Diego, CA (US)

(73) Assignee: RANDAEMON SP. Z O.O., Warsaw (PL)

( * ) Notice: Subject to any disclaimer, the term of this patent is extended or adjusted under 35 U.S.C. 154(b) by 0 days.

(21) Appl. No.: 17/126,265

(22) Filed: Dec. 18, 2020

Related U.S. Application Data

(63) Continuation-in-part of application No. 16/990,087, filed on Aug. 11, 2020, now Pat. No. 10,901,695.

(60) Provisional application No. 62/984,528, filed on Mar. 3, 2020, provisional application No. 63/062,672, filed on Aug. 7, 2020.

(51) Int. Cl.
   *G06F 7/58* (2006.01)
(52) U.S. Cl.
   CPC .................... *G06F 7/588* (2013.01)
(58) Field of Classification Search
   CPC .................................................. G06F 7/58–588
   USPC .................................................. 708/250–256
   See application file for complete search history.

(56) References Cited

U.S. PATENT DOCUMENTS

| | | |
|---|---|---|
| 3,445,591 A | 5/1969 | Koehler |
| 3,790,768 A | 2/1974 | Chevalier |
| 4,527,798 A | 7/1985 | Siekierski |
| 4,855,690 A | 8/1989 | Dias |
| 4,905,176 A | 2/1990 | Schulz |
| 5,570,307 A | 10/1996 | Takahshi |
| 5,627,894 A | 5/1997 | Albert |
| 5,732,138 A | 3/1998 | Noll |
| 5,987,483 A | 11/1999 | Edelkind |
| 6,249,009 B1 | 6/2001 | Kim |
| 8,001,054 B1 | 8/2001 | Peart |

(Continued)

FOREIGN PATENT DOCUMENTS

WO   WO-2014080272 A1 *   5/2014   ............. G06F 7/588

OTHER PUBLICATIONS

International Search Report and Written Opinion for PCT/US2019/017748 dated Dec. 30, 2019 (6 pages).

*Primary Examiner* — Matthew D Sandifer
(74) *Attorney, Agent, or Firm* — Manuel F. de la Cerra

(57) ABSTRACT

Methods are disclosed for manufacturing a true random number generator (TRNG), wherein the TRNG includes a cavity filled with tritium, and an electronic sensor constructed to detect energy from the decay of the tritium. One method includes (a) forming the cavity by bonding an enclosing structure to the sensor or adjacent to the sensor such that a portion of the sensor forms an inner surface of the cavity, (b) injecting the tritium gas into the cavity via one or more ports in the enclosing structure, and (c) sealing the one or more ports. Another method includes (a) applying a drop of tritiated water or tritiated gel to a surface of the electronic sensor, and (b) applying epoxy over the drop of tritiated water or tritiated gel (prior to step (b), the surface of the electronic sensor may be cooled sufficiently to freeze the drop of tritiated water or tritiated gel).

14 Claims, 9 Drawing Sheets

(56) References Cited

U.S. PATENT DOCUMENTS

| | | | |
|---|---|---|---|
| 6,346,700 B1 | 2/2002 | Cunningham | |
| 6,415,309 B1 | 7/2002 | Shilton | |
| 6,430,170 B1 | 8/2002 | Saints | |
| 6,539,410 B1 | 3/2003 | Klass | |
| 6,542,014 B1 | 4/2003 | Saito | |
| 6,687,721 B1 | 2/2004 | Wells | |
| 6,697,829 B1 | 2/2004 | Shilton | |
| 6,745,217 B2 | 6/2004 | Figotkin | |
| 7,031,991 B2 | 4/2006 | Hars | |
| 7,124,157 B2 | 10/2006 | Ikake | |
| 7,476,370 B2 | 1/2009 | Mitsugashira | |
| 8,001,168 B2 | 8/2011 | Tsuyuzaki | |
| 8,037,117 B2 | 10/2011 | Saito | |
| 9,335,972 B2 | 5/2016 | Yang | |
| 10,430,159 B1 * | 10/2019 | Crosier | G06F 7/588 |
| 2012/0030268 A1 | 2/2012 | Liu | |
| 2018/0217817 A1 | 8/2018 | Gorfinkle | |

\* cited by examiner

METHOD AND APPARATUS FOR TRITIUM-BASED TRUE RANDOM NUMBER GENERATOR

PRIORITY APPLICATIONS

This application claims priority as the non-provisional of U.S. Provisional Application Ser. 62/984,528, filed on Mar. 3, 2020, titled "Method And Apparatus For Tritium-Based True Random Number Generator", claims priority as a continuation-in-part of U.S. application Ser. No. 16/990,087, filed on Aug. 11, 2020, titled "Apparatus, Systems, And Methods For Beta Decay Based True Random Number Generator", and claims priority as the non-provisional of U.S. Provisional Application Ser. 63/062,672, filed on Aug. 7, 2020, titled "Method And Apparatus For Beta Decay Based True Random Generator".

This application is also related to U.S. Provisional Application Ser. 62/655,172, filed on Apr. 9, 2018, titled "Apparatus, Systems, And Methods Comprising Tritium Random Number Generator", to U.S. Provisional Application Ser. 62/803,476, filed on Feb. 9, 2019, titled "Apparatus, Systems, And Methods Comprising Tritium Random Number Generator", and to U.S. application Ser. No. 16/273,365, filed on Feb. 12, 2019, titled "Apparatus, Systems, And Methods Comprising Tritium Random Number Generator", now U.S. Pat. No. 10,430,161.

Each of the patent applications, issued patents, and other references discussed and/or cited herein are incorporated by reference as if fully set forth herein.

TECHNICAL FIELD

The present disclosure relates generally to true random number generators, specifically random number generator technologies utilizing the spontaneous tritium decay, as well as apparatus, systems, and methods regarding the same.

BACKGROUND

As opposed to pseudo-random number generators based on algorithms, there are true random number generator (TRNG) devices that depend on natural random processes: multiple bipolar switches, thermal noise, light scattering by dichroic mirrors, chaotic systems, or the decay of radioactive nuclei. Some of these TRNGs are listed in the provisional applications to which the present application claims priority, and those references are incorporated herein by reference as if fully set forth herein.

The decay of radioactive nuclei type is considered to be the most independent from environmental influences like temperature, pressure, or acceleration. However, typical nuclear-based TRNGs require large size detectors to enable registration of particles emitted as a result of radioactive decays. Also, many nuclei used in such devices are highly radioactive and poisonous, hence dangerous to humans if the device is broken.

Therefore, a safe and small TRNG that will not expose the user to dangerous levels of radiation would be advantageous. Such a TRNG can then be used in compact personal devices.

SUMMARY

The invention disclosed herein is a method of manufacturing a true random number generator (TRNG), wherein the TRNG includes a cavity filled with tritium and an electronic sensor constructed to detect energy from the decay of the tritium. A first method includes (a) forming the cavity by bonding an enclosing structure to the sensor or adjacent to the sensor such that a portion of the sensor forms an inner surface of the cavity, (b) injecting the tritium gas into the cavity via one or more ports in the enclosing structure, and (c) sealing the one or more ports. A second method includes (a) applying a drop of tritiated water or tritiated gel to a surface of the electronic sensor, and (b) applying epoxy over the drop of tritiated water or tritiated gel (prior to step (b), the surface of the electronic sensor may be cooled sufficiently to freeze the drop of tritiated water or tritiated gel). In both methods, electrons emitted by tritium are shielded from entering portions of the circuit that are not part of a detector, thus preventing radiation damage to these parts.

In the first method, the enclosing structure may be a curved capillary with a flat portion and a half-sphere comprised of a material with low permeability to hydrogen. The enclosing structure may be is micro-printed. The first method may further include applying epoxy over the enclosing structure.

A TRNG manufactured according to either method may include an amplifier connected to the sensor and constructed to amplify the signal, a filter connected to the amplifier constructed to filter the signal, and a processor connected to the filter. The cavity, sensor amplifier, filter, and processor may be formed on an integrated circuit. The processor may be constructed to perform the following steps: (a) determine whether the signal represents decay events for tritium; (b) set a timer to determine the time period between decay events; (c) based on the time period in step (b), assign a value of a 0 or a 1; (d) store the value in a memory; (e) repeat steps (b)-(d), resulting in a string of values; and (f) generate a true random number based on the string of values. Step (b) may further include determining: a first time period T1 between a first pair of decay events; a second time period T2 between a second pair of decay events; wherein step (c) further comprises comparing T1 to T2 and assigning the value based on the comparison.

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Figure 1A:
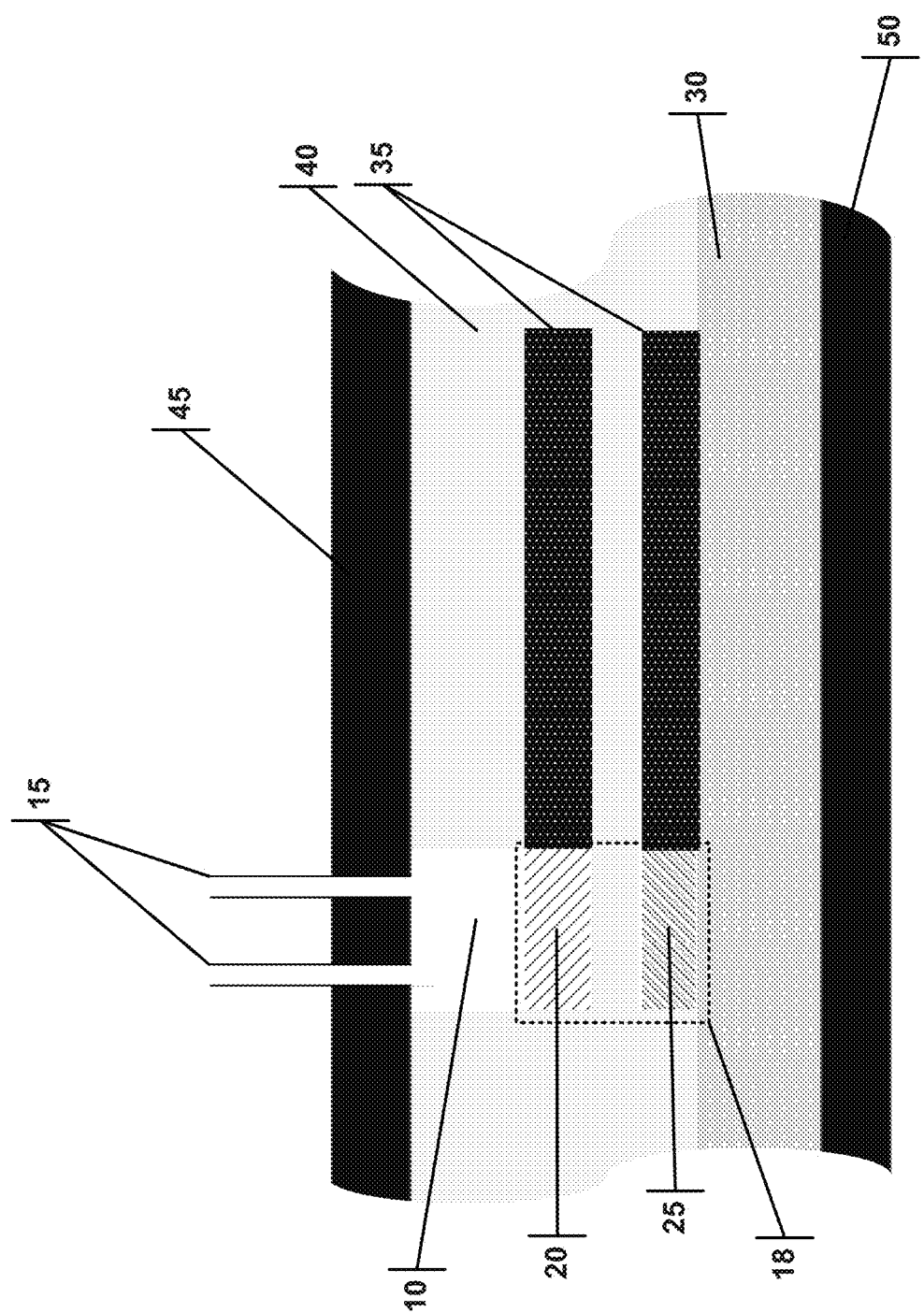
FIG. 1A is a cross-sectional view of a PIN diode detector.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with figures and is provided for ease of reference, where like reference numerals designate corresponding features throughout the specification and figures:

Cavity/Void 10
Filler Tubes 15
PIN Diode 18
N-type silicon 20
P-type silicon 25
Charge-Coupled Device (CCD) Sensor 28
Silicon Substrate 30
Electrodes 35
Insulation 40
Upper casing 45
Lower casing 50
Capillary (Enclosing Structure) 55
Flat Portion 60
3D Micro-Printed Cavity/Void with Tubes Attached (Enclosing Structure) 65
Half-Sphere (Enclosing Structure) 67
Holes/Ports 69
Enclosure Cap 70
Tritiated Water or Tritiated Gel 75
Frozen Tritiated Water Drop 85
Epoxy Spray 90
Epoxy Capsule 95
IC 200
Electronic Sensor/Detector 205
Amplifier 210
Filter 215
Processor 220
Signal Processor 225
Timer 230
Memory 235
Cryptographical Client 240

As opposed to pseudo-random number generators based on algorithms, there are many true random number generator (TRNG) devices that depend on natural random processes: multiple bipolar switches, thermal noise, light scattering by dichroic mirrors, chaotic systems, or the decay of radioactive nuclei. The last group is considered to be the most independent from environmental influences like temperature, pressure, or acceleration. However, typical nuclear-based TRNGs require large size detectors to enable registration of particles emitted as a result of radioactive decays. Also, many nuclei used in such devices are highly radioactive and poisonous, hence dangerous to humans if the device is broken. Various example embodiments of the present apparatus, systems, and methods demonstrate that by using gaseous tritium paired with a suitable solid-state detector one can make a very compact device that can be incorporated into an integrated circuit (IC) chip. Because of small amounts of radioactive material deployed, such an IC can be used inside consumer products like cell phones without endangering people even if the device is destroyed and radioactive material is released. Analog and digital circuits that need to be incorporated into the proposed design of TRNG on IC chip can be easily manufactured with standard epitaxial, implantation, and laser annealing procedures used throughout the industry that makes solid-state devices. Proposed methods of introducing tritium inside an IC chip in close proximity to the detector enable shielding of other elements of IC from electrons emitted by the radiation source, thus protecting these elements against radiation damage. Various example embodiments of the present apparatus, systems, and methods demonstrate, ICs can be filled with suitable gas after they are manufactured and already packaged. Even with a very small amount of radioactive tritium, each such chip can generate many thousands of random bits per second. Then these bits can be stored for later use in solid-state memory incorporated inside ICs.

Thus, such standalone TRNG on-chip can easily provide on-demand thousands of multi-byte random numbers needed for the encryption of communication channels (like voice or text messages) or processes requiring plenty of random numbers (like simulations or gaming).

Radioactive tritium is simply an isotope of hydrogen that, like hydrogen, contains in each nucleus one proton with additional two neutrons. These two neutrons make tritium an unstable isotope with a half-life time of about 12.3 years. Because of that short half-life time, the natural abundance of tritium on Earth is only barely traceable. However, tritium can be easily produced inside nuclear reactors by neutron activation of lithium-6 or boron-10 and their subsequent, fast decay to tritium. In heavy-water moderated reactors, the deuterium nucleus that captured a neutron is also converted into tritium. Because of the use of tritium in the construction of nuclear weapons, production of that material is being continued all the time, excess of the obtained gas being stored and also available for commercial applications. Recently there is a whole cottage industry that produces devices that are self-illuminating like gun sights, flashlights, emergency lights, and jewelry. All these devices are based on the fluorescence of various fluorophores excited by electrons emitted by decaying tritium. The natural decay of tritium into helium produces electrons with an average energy of about 5.7 keV that is sufficient to excite many fluorophores and thus to help emit visible light with different colors depending on the fluorophore. Such devices use only minute amounts of tritium and hence are allowed to be sold to and used by the general public, cf. RoHS list of restricted materials for electronic components that do not contain tritium.

Using tritium to generate plenty of random numbers (bits or bytes) corresponding to the detection of emitted electrons allows for estimation of the amount of tritium gas needed. Let us start with the reexamination of the volume of tritium needed to generate 1 million decays per second. In U.S. Pat. No. 10,430,161, incorporated herein by reference, the inventor calculated the number of tritium atoms needed by estimating how many atoms will decay if the half-life of tritium gas is about 12.3 years. In this application, the inventor takes a different approach. Since the natural radioactivity of gaseous tritium is about 9,650 Ci per gram or $3.57 \times 10^{14}$ decays per gram per second, then with 1 mol of tritium being 6 grams and the volume of 1 mol being about 22.4 liters at normal conditions (room temperature, 1 atm pressure), one gets that about $2 \times 22.4/6/3.57 \times 10^{14} \times 10^6$ liters of gas, or about $2.1 \times 10^{-8}$ liters of pure tritium is needed when a geometric factor of 2 is considered (only half of the decays will emit electrons that will strike the detector, as the other half will hit the walls of the cavity/void). This is a slightly smaller volume than previously calculated ($2.9 \times 10^{-8}$ liters), the difference being mostly due to approximations used in calculating the number of seconds per year and half-life time radioactivity.

Figure 1B:
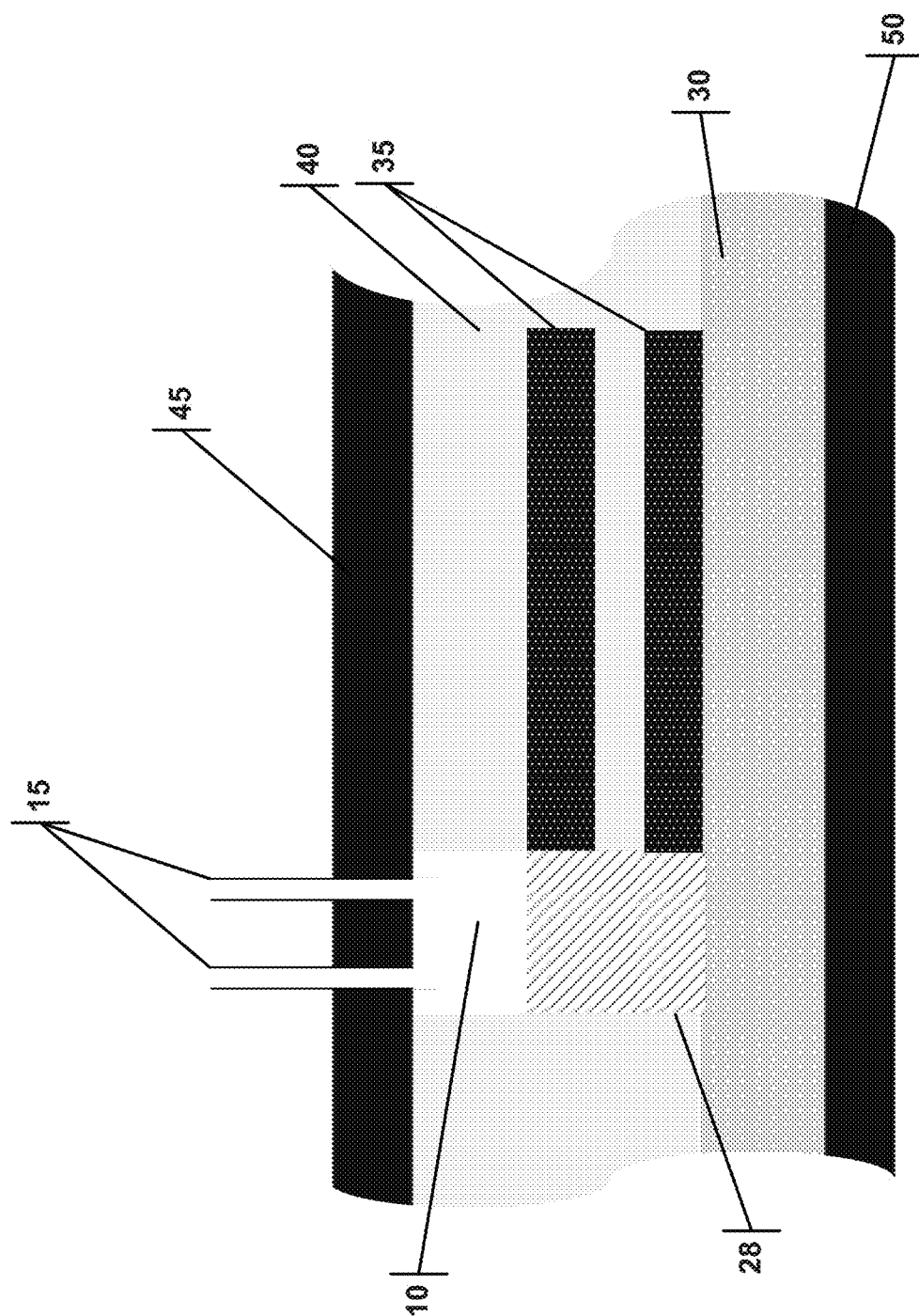
FIG. 1B is a cross-sectional view of a CCD detector.

Still, a cavity/void with dimensions of about 0.3 mm×0.3 mm×0.3 mm will have the desired volume (numbered 10 as depicted in FIGS. 1A and 1B of the U.S. Pat. No. 10,430,161 and reproduced here as FIGS. 1A and 1B). The rectangular volume restricted by the dimensions of 0.3 mm×0.3 mm×0.3 mm will contain the desired amount of tritium gas that can emit about 1 million electrons every second for at least 12 years. With the market cost of 1 gram of tritium gas being about $30,000.00, the amount of gas needed for the above-calculated decays will cost less than 1 cent. The dose of radiation received by a human person (if all that amount of tritium is digested or otherwise swallowed) is equal to about 7 percent of US natural background dose (about 0.23 mSv/year vs. 3.1 mSv/year). This makes a TRNG based on tritium made as per this patent application very safe indeed. These numbers are presented in the Appendix.

As described in U.S. Pat. No. 10,430,161, electrons emitted in the spontaneous decay of tritium that have on average the energy of 5.7 keV can be easily detected by PIN diode (P and N regions that are heavily doped semiconductors with an intrinsic semiconductor region sandwiched between them) or by typical CCD circuit; both these devices can be easily incorporated in a design of specialized IC with TRNG. Such a detector/electronic sensor 205 is shown in FIG. 1A. The cavity/void 10 is filled with tritium through the filling tubes 15. The PIN diode 18 is formed by the N-type silicon 20 and the P-type silicon 25 on a silicon substrate 30. Electrodes 35 carry the detected signal. Insulation 40 may be used both to better insulate the tritium from escaping the cavity/void 10 and to contain the energy emitted by the decay so that the PIN diode can more robustly detect the decay, while other elements of the IC are not exposed to the radiation, since the range of 10 keV electrons in most solid materials is less than 10 microns. To further protect the tritium from escape, the entire detector/electronic sensor (indeed the entire IC) may have an upper and lower casing 45, 50. FIG. 1B illustrates a charge-coupled device (CCD) 28 used as the electronic sensor. Other types of electronic sensors may be used, including as a non-limiting example a CMOS electronic sensor.

However, such a small cavity/void may be difficult to manufacture, especially as filling tubes that would be extremely small and fragile. Since a PIN detector/electronic sensor can be manufactured with a much larger surface area (for example, 1 mm×1 mm), the cavity/void volume can be increased to assist in manufacturing. If a 1 mm layer of gas above such a detector/electronic sensor is applied, the volume of gas needed will be 1 mm$^3$ or about 48 times more than the calculated volume of pure tritium gas needed. An easier to construct, yet suitable, cavity/void, therefore, can be manufactured, and it may be filled with a highly diluted mixture of tritium gas and some other inert gas (like nitrogen).

Figure 2A:
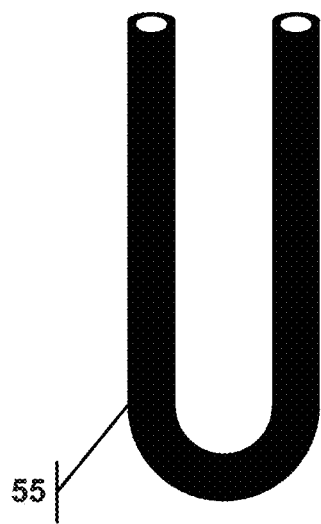
FIG. 2A illustrates a capillary that may be used to manufacture the TRNG.
Figure 2B:
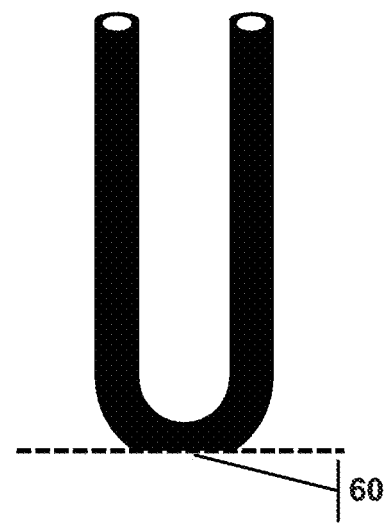
FIG. 2B illustrates the capillary with the bottom filed to form a flat portion.
Figure 2C:
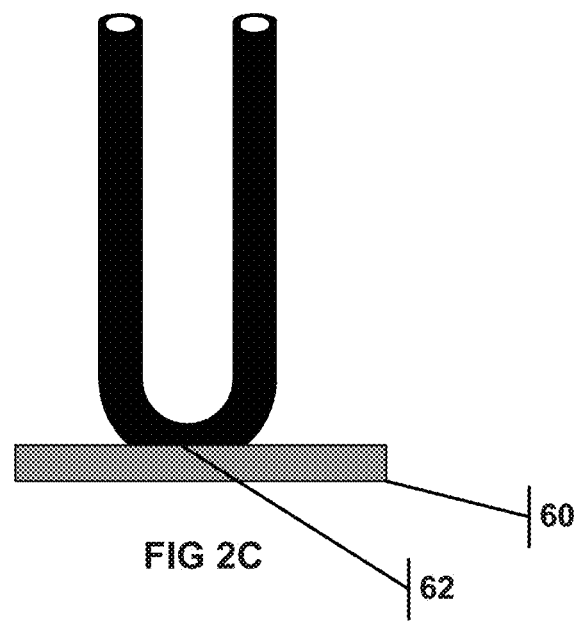
FIG. 2C illustrates the cavity/void formed by bonding the enclosing structure, here a capillary, to the detector/electronic sensor or adjacent to the detector/electronic sensor.

One way of creating the cavity/void with a necessary volume and tubing for filling it with gas would be to use an enclosing structure such as a glass or steel capillary 55 with an internal diameter of about 2 mm that, after bending into a U-shape (FIG. 2A), will be filed to get a flat portion 60 at the bottom (FIG. 2B) that then can be glued to cover the area of a detector/electronic sensor. As shown in FIG. 2C, the cavity/void is formed by bonding the enclosing structure, here a capillary 55, to the detector/electronic sensor or adjacent to the detector/electronic sensor 205 such that a portion of the detector/electronic sensor 62 forms an inner surface of the cavity (FIG. 2C). A capillary configuration would allow the insertion of a prepared capillary during the process of mounting an integrated circuit to the base and covering it with the enclosure.

Figure 3A:
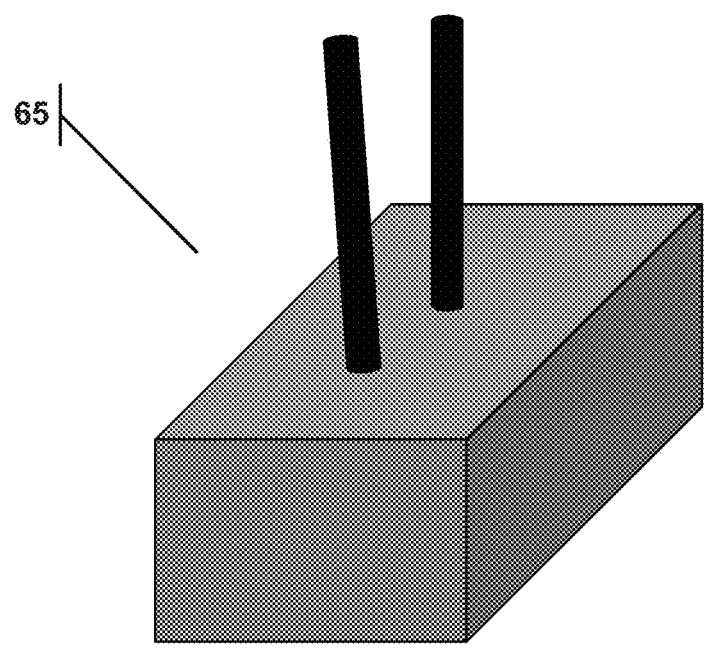
FIG. 3A illustrates a 3D micro-printed cavity/void with the necessary volume and tubes attached.
Figure 3B:
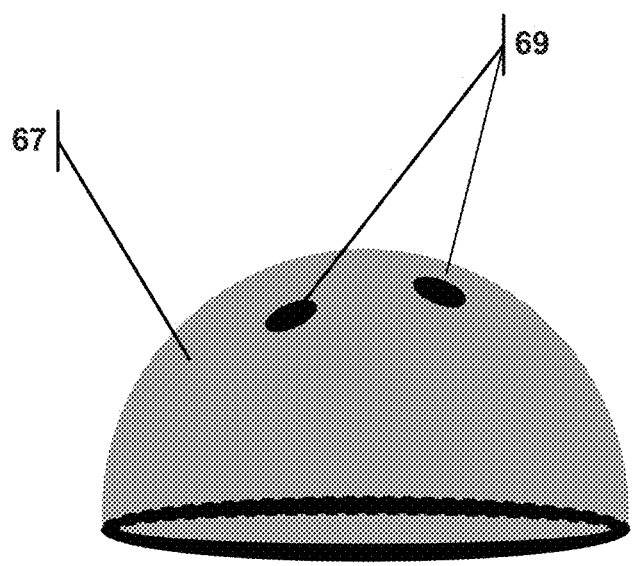
FIG. 3B illustrates an enclosing structure in a half-sphere shape with just two suitable openings or ports on the top.

Similar configurations of cavities/voids may be manufactured by using other enclosing structures, such as a 3D micro-printing from suitable polymer with low hydrogen permeability having the necessary volume and tubes attached 65, as shown in FIG. 3A. Another such enclosing structure is a half-sphere 67 (FIG. 3B) with just two suitable (small diameter) openings or ports on the top 69. Producing such a half-sphere 67 from metals or glass could be done through stamping, for example. In such cases, the detector/electronic sensor can be made round (it can be placed in the middle of the integrated circuit, just under the opening of the enclosure for the cap), for example, if the half-sphere has an internal radius of about 0.75 mm (diameter of 1.5 mm), then the volume of gas filling this half-sphere will be about 0.88 mm$^3$—that would require about 42× dilution of the pure tritium gas (see calculations above) to get enough pulses per second.

Figure 4A:
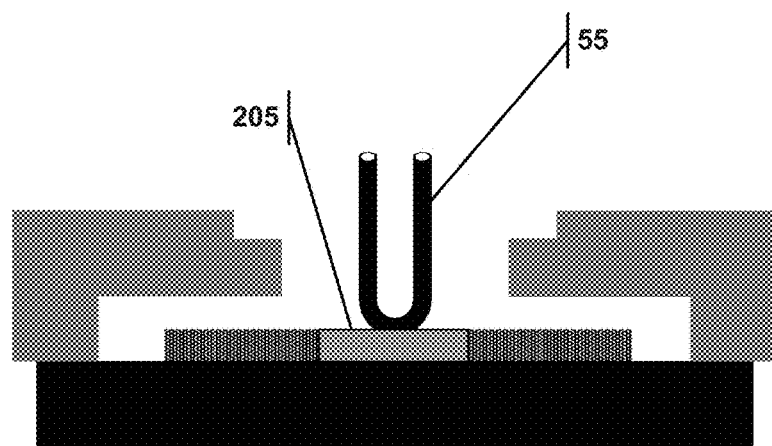
FIG. 4A illustrates the capillary being bonded to the detector/electronic sensor.
Figure 4B:
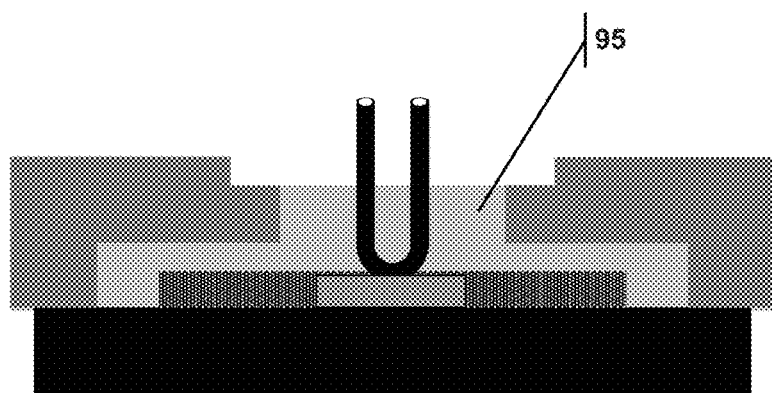
FIG. 4B illustrates the encapsulation of the detector/electronic sensor with epoxy.
Figure 4C:
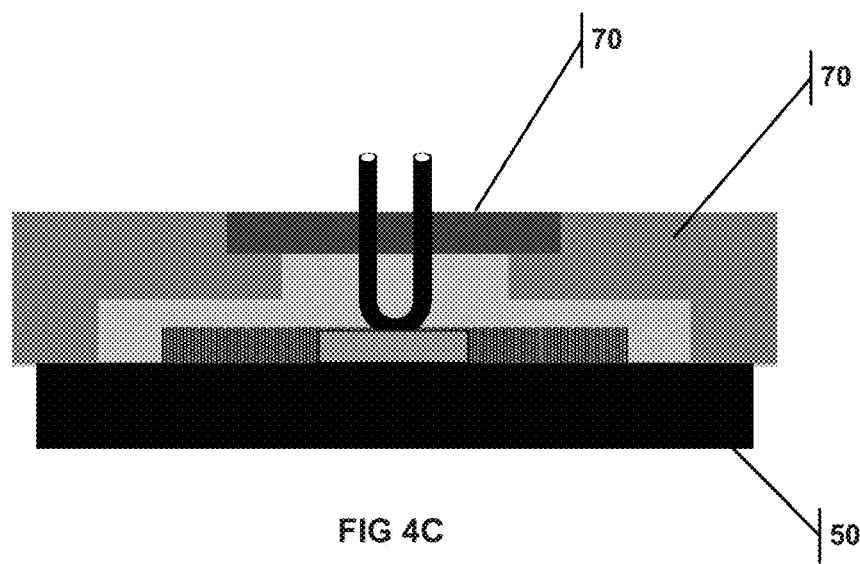
FIG. 4C illustrates the cap being placed on the enclosure.

In all the above-described embodiments, a syringe filled with gas may be used to flush and fill the cavity/void with the necessary tritium, and then the openings or ports can be sealed using, as non-limiting examples, epoxy glue or metalized sticky tape. After the gas is in (for example, by the structures shown in FIGS. 2A-3B), an epoxy may be used to fill the whole structure that is hidden inside the enclosure, thus making it more robust and preventing any mechanical damage due to vibrations, drops, etc. as well as shielding the other components of IC from radiation. This is shown in FIGS. 4A-4C, where the capillary 55 is bonded to the detector/electronic sensor 205 (FIG. 4A), and an epoxy 95 encapsulates the detector/electronic sensor (FIG. 4B). An enclosure cap 70 is placed on the enclosure of the IC (comprised of the upper casing 45 and lower casing 50), as shown in FIG. 4C. The cap 70 may also be used with the liquid and frozen embodiments of the radioactive source, which will now be discussed.

Figure 5:
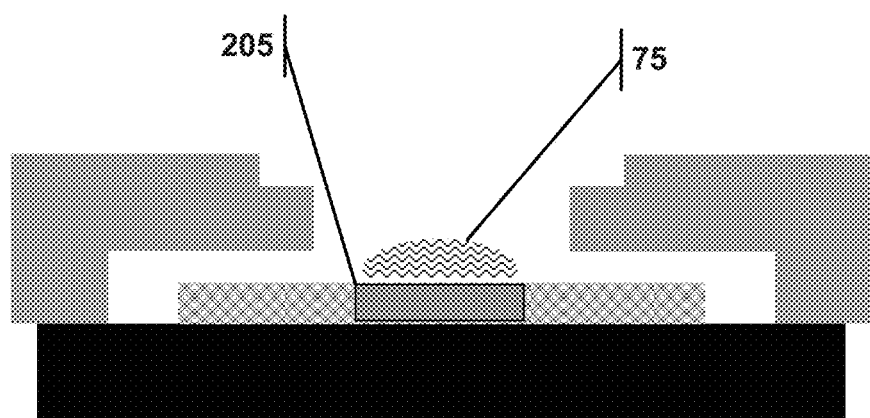
FIG. 5 illustrates a drop of tritiated water or a drop of tritiated gel placed on the detector/electronic sensor.
Figure 6:
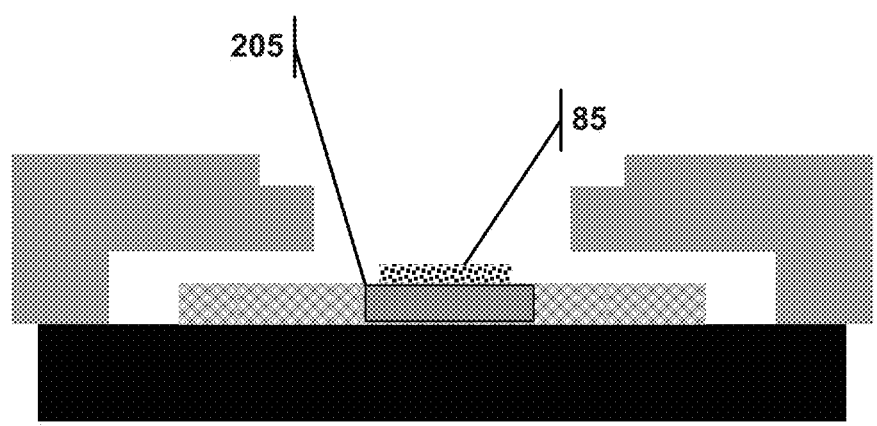
FIG. 6 illustrates freezing the drop of tritiated water or tritiated gel.
Figure 7:
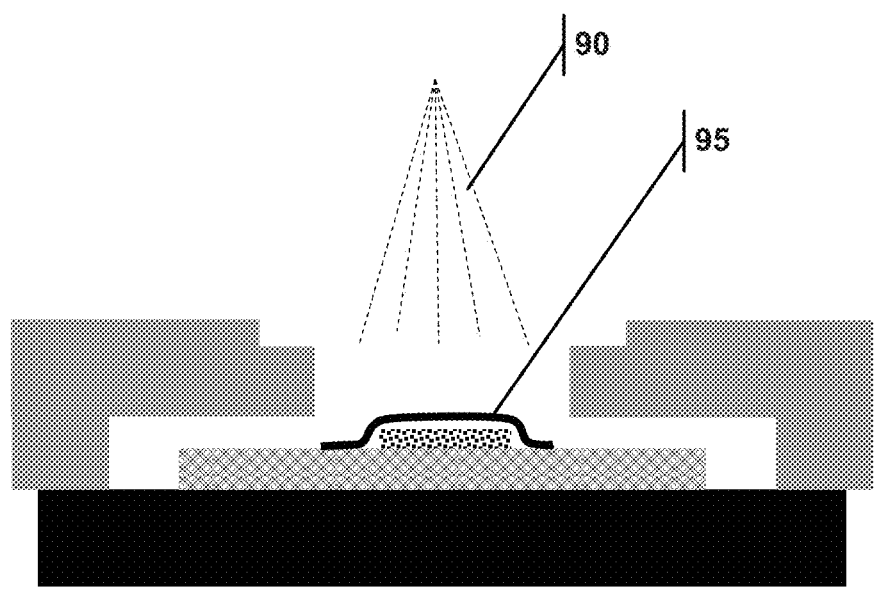
FIG. 7 illustrates encapsulating the drop of tritiated water or tritiated gel with epoxy.

Liquid radioactive material, like $T_2O$ (tritiated water) or some organic gel with hydrogens replaced by tritium, may also be used as the radioactive source. Because the range of 5.7 keV electrons in water is only about 0.8 microns (it would be similar in any gel of comparable density, since the range of such low energy electrons depends mainly on the density of materials that stop electrons), to achieve 1 million pulses, a detector/electronic sensor with the diameter of about 4.25 mm may be used to enable the suitable volume of material producing electrons that could reach detector/electronic sensor. In FIG. 5, a drop of tritiated water or a tritiated gel 75 is placed on the detector/electronic sensor 205 by using a pipette or other micro-manipulator for liquids. In the case of water, to help further assist in manufacturing, the IC can be cooled before placing the tritiated water drop, which will instantaneously freeze the drop (shown in FIG. 6 as frozen a tritiated water drop 85). The water drop may be treated with an epoxy spray 90, forming an epoxy capsule 95 over the drop, as shown in FIG. 7. This same method may be used to cover the drop of tritiated gel. This type of covering the surface of IC is a fairly typical step in the production of electronic devices and is used to mechanically protect the surface of ICs as well as shielding the other components of IC from radiation. After all filling and protection steps are done, the top cover can be glued into place, thus sealing the enclosure of the IC and making it robust. Combinations of the above-described methods can be used, like filling the void with liquid or gel before capping it with epoxy.

Figure 8:
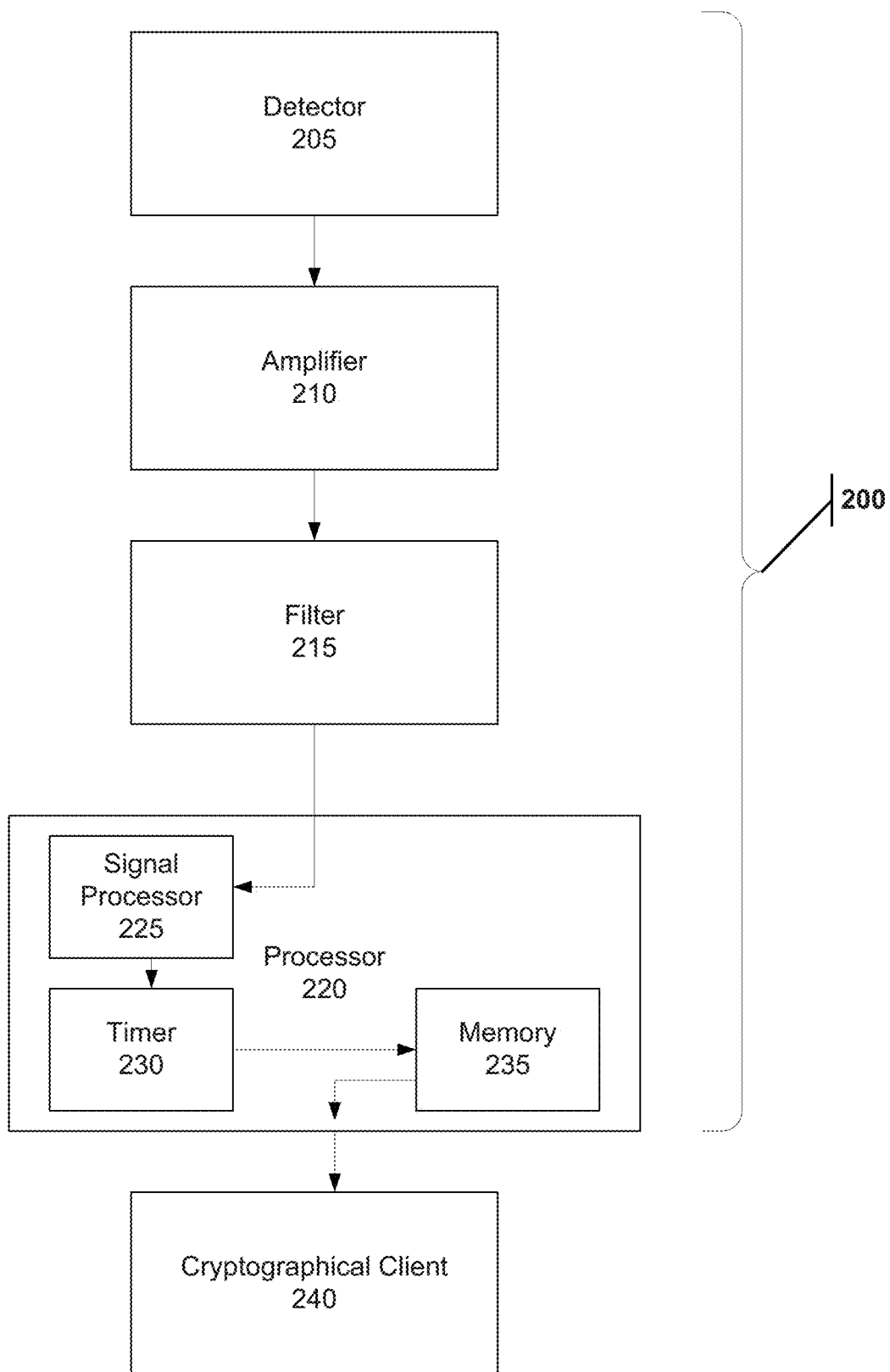
FIG. 8 is a flow diagram of the various components that may be placed on the integrated circuit.

The detector/electronic sensor 205 may be included on an IC 200, which may further include an amplifier 210 (such as a low noise charge-sensitive preamplifier and a pulse shaping amplifier), a filter 215, and a processor 220, as shown in FIG. 8. A cryptographic client 240 may optionally also be on the IC.

Figure 9A:
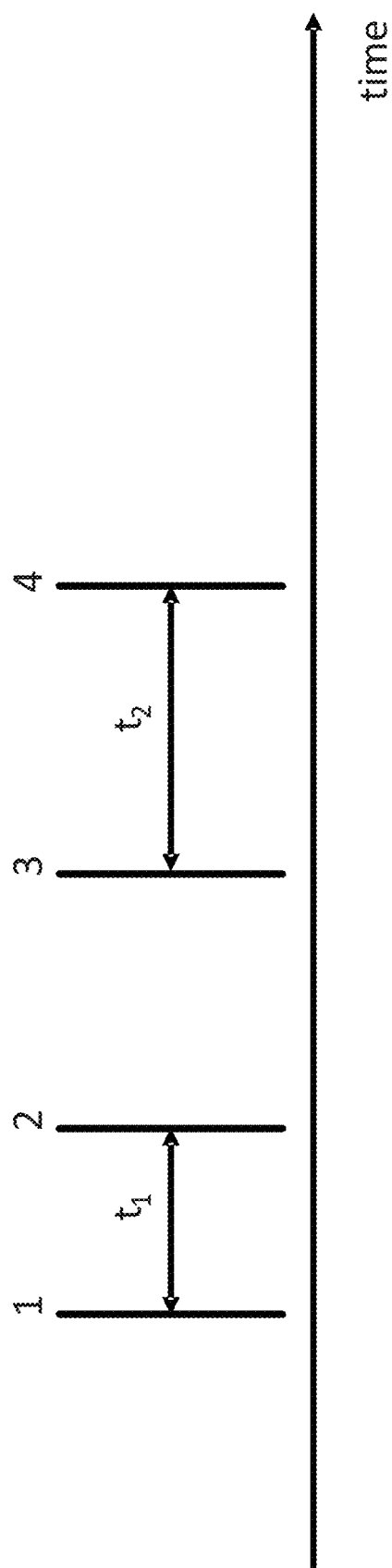
FIG. 9A illustrates the four pulse per random bit schema.

The following is a method for converting random tritium decays resulting in the emission of electrons that are being sensed by PIN diode or CCD-type build-in on-chip detector/electronic sensor 205 discussed above:

1. After each decay of tritium nuclei, one electron with an energy of about 5.7 keV is being emitted.
2. Each such electron creates a pulse of electrons in the detector/electronic sensor 205 with a very typical time profile that enables detection of just that event and not the other possible types of energetic ionizing particles hitting the detector.
3. The analog pulse from the detector/electronic sensor 205 is amplified by the amplifier 210. The amplifier may have a pre-amplifier.
4. The amplified signal from amplifier 210 is filtered by digital filter 215.
5. The filtered signal is processed by processor 220 to determine if the signal corresponds to the electron emitted in the decay of tritium and not by other energetic ionizing particles (s). The processor 220 may include a signal processor 225 that performs this function.
6. If the signal is indeed an electron emitted in decay of tritium, then processor 220 starts a timer 230, which may also be part of the processor 220. The time may optimally be at a clock frequency of the order of several GHz (several times $10^9$ per second). Because electron pulses will be detected on average every microsecond ($10^{-6}$ seconds or between an average number of clock ticks of several thousand), one would have enough accuracy to detect differences in the randomness of appearances of pulses in time.
7. Steps 1-6 are repeated to detect a second pulse from subsequent decay, which triggers the processor 220 to stop the timer.
8. The value of the timer is stored in memory 235. This is shown as T1 in FIG. 9A.
9. The next two pulses result in another timer value (T2; FIG. 9A) to be stored in memory 235. To generate T1 and T2, four pulses are used in FIG. 9A.
10. Two numbers (T1 and T2) stored in memories are compared—if the first is larger, then the system creates a bit with value 1, in the other case the value is zero. (This schema can be inverted as well). These bit values are stored in memory 235. In the very rare situation that two numbers are exactly the same, the whole sequence may be discarded. So, for each random bit, four pulses are used.
11. Steps 1-10 are repeated, typically several hundred thousand times per second.
12. The system generates multibyte numbers, typically 256 bits or 512 bits long, and these are stored in the memory bank for further use by the cryptographic client 240 of the chip, providing long (large) random numbers needed for the encryption of communication channels.
13. After a number is used by the cryptographic client 240, the FILO system (first in, last out) moves to the other number while the process described above adds more numbers to the memory until it is filled. In such case of filling the whole memory bank, numbers kept longest in the memory are expunged to make space for new numbers generated by the system. This capability makes the system much more resistant against hacking etc.

Figure 9B:
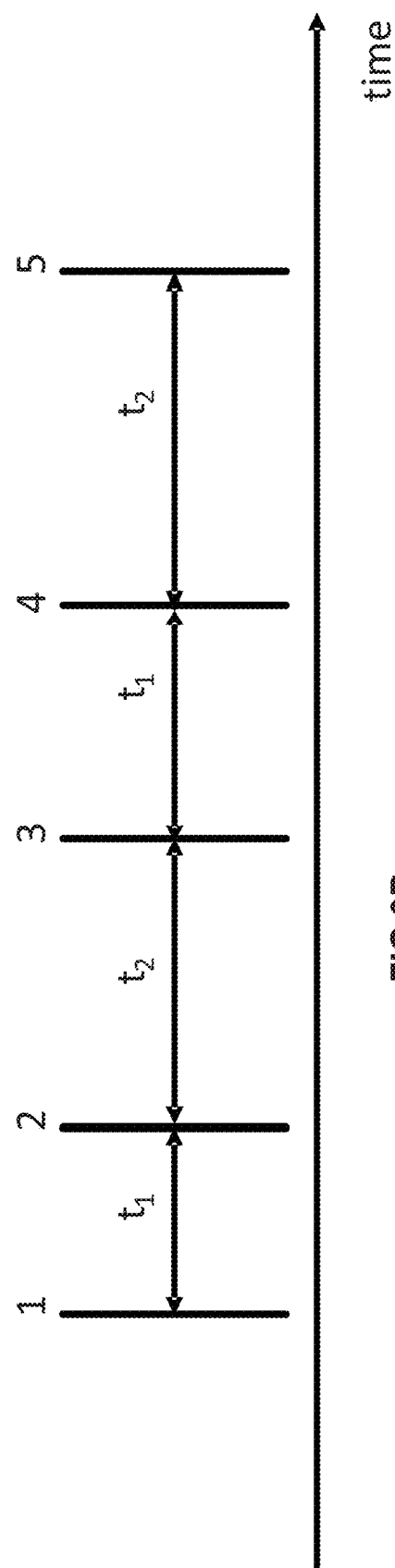
FIG. 9B illustrates the two pulse per random bit schema.

It should be noted that the system may not use four pulses per random bit. Instead, the system may be constructed as shown in FIG. 9B, where the timer resets at each pulse detection and is always counting. The benefit to this system is that it only requires two pulses per random bit, but the periods between pulses are somewhat dependent on one other because they are linked by a common pulse event, so the resulting string of bits may not be as random as the schema provided in FIG. 9A and may require additional randomization.

The memory can supply a necessary number of bytes (bits) on demand for e.g., secure random encryption of communication channels (i.e., cryptographic client 240) of the device in which this specialized IC is mounted or for random processes required by simulations, modeling, and gaming. Additional software testing of random number sequences built into IC chip allows for real-time quality control of the random character of bits generated—if parts of the sequence do not pass the test(s), such a sequence would be removed and would never be used as an output. This type of proofing further improves the random character of sequences (entropy) generated by the chip.

Various example embodiments of the present apparatus, systems, and methods provide the ability to manufacture TRNG IC on the standard semiconductor production line. The only difference is that the packaging should leave as calculated above the cavity/void of the size of about 0.03 mm$^3$ with suitable openings that can be connected to the source of gaseous tritium to fill this cavity/void to subsequently seal the cavity/void by thermal and pressure means (like a heat sealer as a non-limiting example). Otherwise, the produced IC will be very similar in shape and other characteristics to other ICs typically used in the manufacturing of consumer goods because electrons emitted during the decay of tritium will not be able to penetrate the packaging material (plastic) of the IC. The same packaging will also shield the embedded detector/electronic sensor from any external radiation of comparable or even much higher energies. Even if such high-energy particles will pass through packaging plastic, they will generate different types of pulses, and these can be differentiated by filtering them out from the 5.7 keV pulses that are being used to generate random numbers.

RoHS specifies maximum levels for the following 10 restricted materials. The first six applied to the original RoHS while the last four were added under RoHS 3. Following is the RoHS list of restricted materials from www.rohsguide.com/rohs-substances.htm:

Lead (Pb): <1000 ppm
  Lead is commonly used in the electrical and electronics industry in solder, lead-acid batteries, electronic components, cable sheathing, and in the glass of cathode-ray tubes.
Mercury (Hg): <100 ppm
  Mercury is a widely used metal in the production of electrical and electronic appliances and is concentrated in batteries, switches and thermostats, and fluorescent lamps.
Cadmium (Cd): <100 ppm
  Cadmium is used in electronic equipment, car batteries, and pigments.
Hexavalent Chromium (Cr VI)<1000 ppm
  While some forms of chromium are non-toxic, Chromium VI can produce toxic effects.
Polybrominated Biphenyls (PBB): 1000 ppm
  These are flame retardants found in electronic and electrical appliances. They have been found in indoor dust and air through evaporation from plastics.
Polybrominated Diphenyl Ethers (PBDE): <1000 ppm
  These are also flame retardants found in electronic and electrical appliances. Combustion of printed wiring boards releases toxic emissions.
Bis(2-Ethylhexyl) phthalate (DEHP): <1000 ppm
  These are used to soften PVC and vinyl insulation on electrical wires.
Benzyl butyl phthalate (BBP): <1000 ppm
  These are used to soften PVC and vinyl insulation on electrical wires.
Dibutyl phthalate (DBP): <1000 ppm
  These are used to soften PVC and vinyl insulation on electrical wires.
Diisobutyl phthalate (DIBP): <1000 ppm
  These are used to soften PVC and vinyl insulation on electrical wires.

Any of the suitable technologies, materials, and designs set forth and incorporated herein may be used to implement various example aspects of the invention as would be apparent to one of skill in the art.

Although exemplary embodiments and applications of the invention have been described herein including as described above and shown in the included example Figures, there is no intention that the invention is limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system, or method falls within the scope of one of the claims that are allowed by the patent office based on this or any related patent application.

The invention claimed is:

1. A method for manufacturing a true random number generator (TRNG), wherein the TRNG comprises a cavity filled with tritium and an electronic sensor constructed to detect energy from the decay of the tritium, the method comprising:
  a. forming the cavity by bonding an enclosing structure to the sensor or adjacent to the sensor such that a portion of the sensor forms an inner surface of the cavity;
  b. injecting the tritium gas into the cavity via one or more ports in the enclosing structure; and
  c. sealing the one or more ports.

2. The method of claim 1, wherein the enclosing structure is a curved capillary with a flat portion.

3. The method of claim 1, wherein the enclosing structure is a half-sphere comprised of a material with low permeability to hydrogen.

4. The method of claim 1, wherein the enclosing structure is micro-printed.

5. The method of claim 1, further comprising applying epoxy over the enclosing structure.

6. A true random number generator (TRNG) manufactured according to claim 1, wherein the electronic sensor produces a signal for the detected energy, the TRNG further comprising:
  an amplifier connected to the sensor and constructed to amplify the signal;
  a filter connected to the amplifier constructed to filter the signal; and
  a processor connected to the filter.

7. The TRNG of claim 6, wherein the processor is constructed to perform the following steps:
  d. determine whether the signal represents decay events for tritium;
  e. set a timer to determine the time period between decay events;
  f. based on the time period in step (e), assign a value of a 0 or a 1;
  g. store the value in a memory;
  h. repeat steps (e)-(g) resulting in a string of values; and i. generate a true random number based on the string of values.

8. The TRNG of claim 7,
wherein step (e) further comprises determining:
   a first time period T1 between a first pair of decay events; and
   a second time period T2 between a second pair of decay events; and
wherein step (f) further comprises comparing T1 to T2 and assigning the value based on the comparison.

9. The TRNG of claim 6, wherein the cavity, sensor amplifier, filter, and processor are formed on an integrated circuit.

10. A method for manufacturing a true random number generator (TRNG), wherein the TRNG comprises a cavity filled with tritium, and an electronic sensor is constructed to detect energy from the decay of the tritium, the method comprising:
   a. applying a drop of tritiated water or tritiated gel to a surface of the electronic sensor; and
   b. applying epoxy over the drop of tritiated water or tritiated gel.

11. The method of claim 10, further comprising cooling the surface of the electronic sensor sufficiently to freeze the drop of tritiated water or tritiated gel before step (b).

12. The TRNG of claim 11, wherein the cavity, sensor amplifier, filter, and processor are formed on an integrated circuit.

13. The TRNG of claim 10, wherein the processor is constructed to perform the following steps:
   c. determine whether the signal represents decay events for tritium;
   d. set a timer to determine the time period between decay events;
   e. based on the time period in step (d), assign a value of a 0 or a 1;
   f. store the value in a memory;
   g. repeat steps (d)-(f) resulting in a string of values; and
   h. generate a true random number based on the string of values.

14. The TRNG of claim 13,
wherein step (d) further comprises determining:
   a first time period T1 between a first pair of decay events; and
   a second time period T2 between a second pair of decay events; and
wherein step (e) further comprises comparing T1 to T2 and assigning the value based on the comparison.

* * * * *